J. A. WINEBRENNER.
Irrigating Device.

No. 204,695. Patented June 11, 1878.

Witnesses:

Inventor:
John A. Winebrenner

UNITED STATES PATENT OFFICE.

JOHN A. WINEBRENNER, OF JEFFERSON, ASSIGNOR OF TWO-THIRDS HIS RIGHT TO MARSHALL H. WINEBRENNER AND CORA A. EMMERT, OF CHICAGO, ILLINOIS.

IMPROVEMENT IN IRRIGATING DEVICES.

Specification forming part of Letters Patent No. 204,695, dated June 11, 1878; application filed May 4, 1878.

*To all whom it may concern:*

Be it known that I, JOHN A. WINEBRENNER, of Jefferson, Cook county, State of Illinois, have invented a new and useful Improvement in Irrigating Devices, of which the following is a full description, reference being had to the accompanying drawing, in which—

Figure 1:
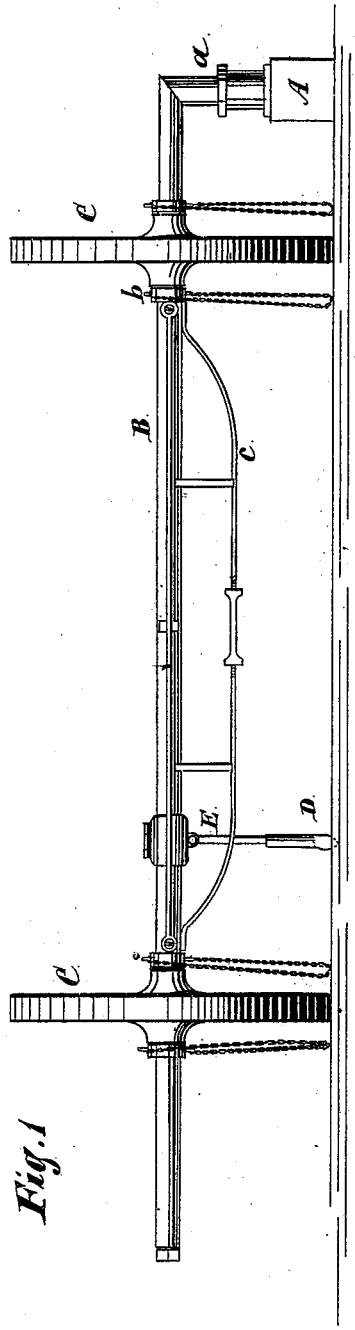
Figure 2:
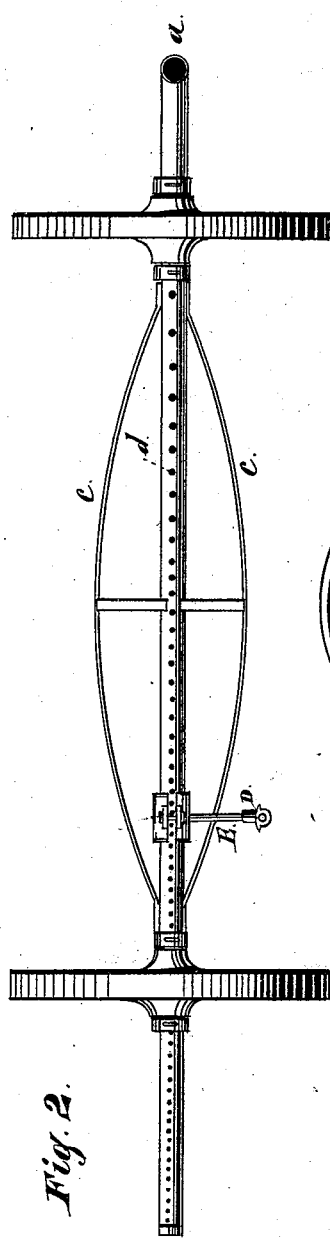
Figure 3:
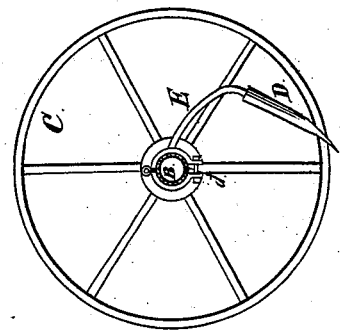

Figure 1 is a front elevation. Fig. 2 is a bottom or under-side view; Fig. 3, a cross-section, omitting braces.

The objects of my invention are, first, to provide an improved method and device for irrigating lands, especially adapted for the use of seedsmen, florists, market-gardeners, growers of strawberries, onions, tobacco, and other plants; second, to adapt the irrigating device to purposes of cultivation.

The following is a brief general description of my mode of irrigating lands and the device which I have adopted for that purpose:

In the ground to be irrigated suitable water-pipes are to be laid, and plugs are to be provided suitably located, as hereinafter more fully set forth, the distance between the same depending on the quantity of ground to be watered at a single operation. I think that one plug at the center of each acre of ground will be sufficient, though it may be advisable to locate them somewhat nearer to each other.

I then provide a long strong pipe or tube, being in length equal to one-half the distance between the plugs, perforated on one side, mounted on one or two wheels, and adapted at one end to be connected by means of a suitable joint to any one of the plugs, and rotate in a circle around the plug as a center. Water being permitted to flow into this perforated pipe while in motion, the ground over which it travels will be watered. The device is to be moved from one plug to another, as occasion requires.

In the drawings, A represents a plug connected with a water-pipe, and provided with suitable devices for turning the water on and off. B is a strong pipe, one end *a* of which is adapted to be connected by a suitable joint to any one of the plugs in such manner that the pipe can be rotated around the plug as a center. The other end is closed. This pipe B is provided with a series of perforations, *d*, on the under side, preferably; and a uniform distribution of water is secured by varying the number, size, and distance apart of such perforations or orifices. Instead of the perforations shown, a number of sprinkling-roses may be inserted in the pipe B.

C C are wheels, upon which the pipe B is mounted, the said pipe passing through the hubs. The pipe is provided with suitable boxes *b*, on which the wheels revolve. They are held in place by means of collars and set-screws, or in other suitable manner. *c* are iron rods serving the purpose of braces. D is a shovel or cultivator-tooth upon the lower end of a standard, E. As shown, it is secured at its upper end to the lower half of a hinged collar, which can slide upon B, and can be held in any desired position by means of a set-screw clamping the two halves of the collar upon the pipe, but so that if the shovel comes in contact with an obstruction it will yield, and not break the standard.

The pipe is to be rotated around the plug as a center by means of a horse, whose path should be the same as that of the outer wheel. The pipe can be rotated around the plug as a center by means of a single horse placed in front of the outer wheel, suitable chains or other connecting devices being used, and it can be moved from one plug to another by means of two horses, one in front of each wheel, with comparatively little injury to the plants.

In use for irrigating, the inner end of the pipe B is to be suitably connected with the plug A, and the pipe is then to be rotated around A as a center. At the same time the water being let on will escape through the perforations in B, and be distributed over the ground over which the pipe passes, except where the wheels travel. It may be advisable to place no perforations in B between the inner wheel and plug.

When the cultivating shovels or teeth are to be used it will be necessary to have plants arranged in concentric circles. This can be done when the plants are raised directly from seeds by means of suitable seeding devices located back of and connected with B while it is being rotated, the rate at which the seed flows being properly adjusted.

The pipe B may be of iron, about six inches in diameter, and of any suitable length. Water can be supplied in any known suitable manner. I mention driven or tube wells with pumps, operated either by horse or steam power, as a source from which water can be conveniently obtained.

Soluble manures, such as superphosphates and others, may be commingled in a suitable manner with the flowing water, and applied evenly and in definite quantity to the growing crops. This may be done by placing the liquid manure in a tank communicating with the water-supply pipe, using a cock to regulate the flow.

What I claim as new, and desire to secure by Letters Patent, is as follows:

1. A pipe, B, provided with suitable perforations or sprinkling devices, and mounted on one or more wheels or other suitable support, and adapted to be connected with and rotate about a plug, A, substantially as and for the purposes set forth.

2. In combination with a perforated pipe, B, adapted to be connected with and rotate about a plug, A, a suitable number of cultivating-shovels or teeth, D, substantially as and for the purposes specified.

JOHN A. WINEBRENNER.

Witnesses:
E. A. WEST,
O. W. BOND.